United States Patent
Zhang et al.

(10) Patent No.: US 11,032,042 B2
(45) Date of Patent: Jun. 8, 2021

(54) CANDIDATE CONTROL CHANNEL RESOURCE DETERMINING METHOD AND APPARATUS

(71) Applicant: HUAWEI TECHNOLOGIES CO., LTD, Shenzhen (CN)

(72) Inventors: Xu Zhang, Beijing (CN); Lixia Xue, Beijing (CN); Bingyu Qu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 16/504,265

(22) Filed: Jul. 6, 2019

(65) Prior Publication Data

US 2019/0356436 A1    Nov. 21, 2019

Related U.S. Application Data

(63) Continuation of application No. PCT/CN2018/071603, filed on Jan. 5, 2018.

(30) Foreign Application Priority Data

Jan. 6, 2017 (CN) .......................... 201710011408.2

(51) Int. Cl.
*H04W 72/04* (2009.01)
*H04L 5/00* (2006.01)

(52) U.S. Cl.
CPC .......... *H04L 5/0046* (2013.01); *H04L 5/0005* (2013.01); *H04L 5/0032* (2013.01); *H04W 72/0453* (2013.01)

(58) Field of Classification Search
CPC ...... H04B 7/02; H04B 7/0413; H04B 7/0452; H04L 5/0005; H04L 5/0007; H04L 5/001;
(Continued)

(56) References Cited

U.S. PATENT DOCUMENTS 8,761,109 B2 * 6/2014 Nory ................. H04W 74/0833
370/329
9,088,974 B2 * 7/2015 Gaal ....................... H04L 5/001
(Continued)

FOREIGN PATENT DOCUMENTS

| CN | 102594537 A | 7/2012 |
| CN | 102843748 A | 12/2012 |

(Continued)

OTHER PUBLICATIONS

Huawei, HiSilicon, Search space design, 3GPP TSG RAN WG1 Meeting #89, R1-1706944, 4 pages, May 2017.*
(Continued)

*Primary Examiner* — Frank Duong
(74) *Attorney, Agent, or Firm* — Kilpatrick Townsend & Stockton LLP

(57) ABSTRACT

A candidate control channel resource determining method and apparatus are provided. Under the method, a first and a second aggregation level can be determined by a terminal. The aggregation level is a quantity of control channel resource elements in a candidate control channel. The first aggregation level is less than the second aggregation level. Control channel resource elements in a candidate control channel set corresponding to the second aggregation level form a first quantity of candidate control channel sets corresponding to the first aggregation level. One of the first quantity of candidate control channel sets corresponding to the first aggregation level can be determined as a target set based on an identifier of the terminal. A control channel resource element occupied by each candidate control channel in the target set can be determined. A candidate control channel in the target set can be detected for a received signal.

18 Claims, 6 Drawing Sheets

(58) Field of Classification Search
CPC ... H04L 5/0023; H04L 5/0032; H04L 5/0037; H04L 5/0046; H04L 5/0048; H04L 5/0053; H04L 5/008; H04W 28/04; H04W 72/04; H04W 72/042; H04W 72/0406; H04W 72/0446; H04W 72/0453; H04W 72/048

See application file for complete search history.

(56) References Cited

U.S. PATENT DOCUMENTS

| | | | |
|---|---|---|---|
| 9,571,241 B2* | 2/2017 | Baker | H04L 5/0023 |
| 10,542,531 B2* | 1/2020 | Kim | H04L 1/0046 |
| 2010/0279628 A1 | 11/2010 | Love et al. | |
| 2011/0038275 A1 | 2/2011 | Kim et al. | |
| 2013/0003692 A1 | 1/2013 | Nishio et al. | |
| 2015/0195821 A1* | 7/2015 | Li | H04L 5/0053 370/329 |
| 2018/0198594 A1* | 7/2018 | Tiirola | H04W 74/006 |
| 2020/0029307 A1* | 1/2020 | Takeda | H04W 72/042 |
| 2020/0067675 A1* | 2/2020 | Takeda | H04L 5/0051 |

FOREIGN PATENT DOCUMENTS

| | | |
|---|---|---|
| EP | 2824865 A1 | 1/2015 |
| WO | 2009116816 A2 | 9/2009 |

OTHER PUBLICATIONS

Samsung, "Search Space Design Parameters", 3GPP TSG RAN WG1 Meeting #89 R1-1707989, Hangzhou, China, May 15-19, 2017, total 6 pages.

Research in Motion et al., "On Remaining Issues in E-PDCCH Search Space Design", 3GPP TSG RAN WG1 Meeting #70bis R1-124245, San Diego, USA, Oct. 8-12, 2012, total 7 pages.

3GPP TSG RAN WG1 Meeting #72,R1-130246: 'Corrections to EPDCCH search space', LG Electronics, St Julian's, Malta, Jan. 28-Feb. 1, 2013, total 8 pages.

3GPP TSG RAN WG1#52bis,R1-081567,:'Randomization Function for PDCCH search space', LG Electronics, Mar. 31-Apr. 4, 2008, total 16 pages.

R1-103957 LG Electronics,"UE-specific Search Space Design for Cross-Carrier Scheduling",3GPP TSG RAN WG1 Meeting #61bis,Dresden, Germany, Jun. 28-Jul. 2, 2010,total 10 pages.

3GPP TS 36.213 V14.1.0 (Dec. 2016),3rd Generation Partnership Project;Technical Specification Group Radio Access Network;Evolved Universal Terrestrial Radio Access (E-UTRA);Physical layer procedures(Release 14), total 414 pages.

ZTE et al,"NR Downlink DCI Design and Procedure",3GPP TSG RAN WG1 Meeting #87, R1-1611293, Reno, USA Nov. 14-18, 2016, total 4 pages.

Qualcomm Incorporated,"UE power saving for PDCCH monitoring",3GPP TSG-RAN WG1 #87, R1-1612065, Nov. 14-18, 2016, Reno, Nevada, USA, total 3 pages.

* cited by examiner

CANDIDATE CONTROL CHANNEL RESOURCE DETERMINING METHOD AND APPARATUS

CROSS-REFERENCE TO RELATED APPLICATIONS

This application is a continuation of International Application No. PCT/CN2018/071603, filed on Jan. 5, 2018, which claims priority to Chinese Patent Application No. 201710011408.2, filed on Jan. 6, 2017. The disclosures of the aforementioned applications are hereby incorporated by reference in their entireties.

TECHNICAL FIELD

This application relates to the field of communications technologies, and in particular, to a candidate control channel resource determining method and apparatus.

BACKGROUND

A long term evolution (Long Term Evolution, LTE) system standard formulated by the 3rd generation partnership project (the 3rd Generation Partnership Project, 3GPP) is considered as a fourth-generation wireless access system standard. In an existing LTE system, before receiving service data, a terminal needs to learn of downlink control information (Downlink Control Information, DCI) sent by a base station to the terminal. The DCI is carried by using a physical downlink control channel. To obtain the DCI, the terminal needs to first receive signals on a plurality of candidate control channels on the physical downlink control channel, detect the plurality of candidate control channels based on the signals on the plurality of candidate control channels, and demodulate and decode the DCI carried on the plurality of candidate control channels, to finally obtain the DCI. The detection includes: estimating channel states by using reference signals on the candidate control channels, and demodulating and decoding the received signals based on channel state estimation results. A set including the plurality of candidate control channels is also referred to as search space. In addition, candidate control channels in the search space that include a same quantity of control channel resource elements may be classified into one group, and a quantity of control channel resource elements included in a candidate control channel in each group is defined as an aggregation level of the group.

To reduce time overheads of channel estimation, candidate control channels at two aggregation levels may share some control channel resource elements, and further share reference signals in different control channel resource elements. However, this results in an excessively high control channel resource element aggregation degree. To be specific, search space with different aggregation levels shares a same control channel resource element, resulting in an excessively high overlapping probability of resource elements in control channel resource sets detected by different terminals, and further resulting in an increase in a collision probability between different candidate control channels. Consequently, a control channel capacity is reduced.

Therefore, when search space including control channels is designed, an urgent problem to be resolved is how to reduce channel estimation time for a candidate control channel and reduce a collision probability between different candidate control channels.

SUMMARY

Embodiments of this application provide a candidate control channel resource determining method and apparatus, to reduce a channel estimation time for a candidate control channel and reduce a collision probability between different candidate control channels.

According to a first aspect, an embodiment of this application provides a candidate control channel resource determining method, including:

determining, by a terminal, a first aggregation level and a second aggregation level, where the aggregation level is a quantity of control channel resource elements included in a candidate control channel, the first aggregation level is less than the second aggregation level, and control channel resource elements included in a candidate control channel set corresponding to the second aggregation level form a first quantity of candidate control channel sets corresponding to the first aggregation level;

determining, by the terminal, one of the first quantity of candidate control channel sets corresponding to the first aggregation level as a target set based on a terminal identifier of the terminal, and determining a control channel resource element occupied by each candidate control channel in the target set; and detecting, by the terminal, a candidate control channel in the target set for a received signal.

According to the foregoing method, the terminal determines one of the first quantity of candidate control channel sets corresponding to the first aggregation level as the target set based on the terminal identifier, and performs detection in the control channel resource element occupied by each candidate control channel in the target set. Because the control channel resource element occupied by the candidate control channel in the candidate control channel set corresponding to the first aggregation level is related to the terminal identifier, terminals may distinguish, by using terminal identifiers, between candidate control channel sets corresponding to the first aggregation level that correspond to the terminals. Therefore, a control channel resource element aggregation degree is reduced, a collision probability between candidate control channels of different terminals is reduced, and a control channel capacity is improved. In addition, because a candidate control channel corresponding to the first aggregation level and a candidate control channel corresponding to the second aggregation level may share some control channel resource elements, time overheads of channel estimation can be reduced.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the determining a control channel resource element occupied by each candidate control channel in the target set includes:

determining, by the terminal based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

Optionally, the method further includes:

determining, by the terminal, the control channel resource elements included in the candidate control channel set corresponding to the second aggregation level, where a control channel resource element occupied by each candidate control channel in the candidate control channel set corresponding to the second aggregation level is determined based on the terminal identifier.

According to a second aspect, a candidate control channel resource determining method is provided, including:

determining, by a network device, control information; and determining, by the network device, a control channel resource element occupied by each candidate control channel in a target set, and sending the control information on a control channel resource element occupied by at least one candidate control channel in the target set, where the target set is a candidate control channel set that is of a first aggregation level and that is determined from a first quantity of candidate control channel sets corresponding to the first aggregation level based on a terminal identifier of a terminal, the first quantity of candidate control channel sets corresponding to the first aggregation level include control channel resource elements included in a candidate control channel set corresponding to a second aggregation level, the first aggregation level is less than the second aggregation level, and the aggregation level is a quantity of control channel resource elements included in a candidate control channel.

According to the foregoing method, the network device determines one of the first quantity of candidate control channel sets corresponding to the first aggregation level as the target set based on the terminal identifier, and performs detection in the control channel resource element occupied by each candidate control channel in the target set. Because the control channel resource element occupied by the candidate control channel in the candidate control channel set corresponding to the first aggregation level is related to the terminal identifier, the network device may distinguish, by using terminal identifiers, between candidate control channel sets corresponding to the first aggregation level that correspond to terminals. Therefore, a control channel resource element aggregation degree is reduced, a collision probability between candidate control channels of different terminals is reduced, and a control channel capacity is improved.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the determining, by the network device, a control channel resource element occupied by each candidate control channel in a target set includes:

determining, by the network device based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

According to a third aspect, a candidate control channel resource determining apparatus is provided, including:

a processing unit, configured to determine a first aggregation level and a second aggregation level, where the aggregation level is a quantity of control channel resource elements included in a candidate control channel, the first aggregation level is less than the second aggregation level, and control channel resource elements included in a candidate control channel set corresponding to the second aggregation level form a first quantity of candidate control channel sets corresponding to the first aggregation level, where the processing unit is configured to: determine one of the first quantity of candidate control channel sets corresponding to the first aggregation level as a target set based on a terminal identifier of the terminal, and determine a control channel resource element occupied by each candidate control channel in the target set; and a transceiver unit, configured to detect a candidate control channel in the target set for a received signal.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the processing unit is specifically configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

Optionally, the processing unit is specifically configured to:

determine the control channel resource elements included in the candidate control channel set corresponding to the second aggregation level, where a control channel resource element occupied by each candidate control channel in the candidate control channel set corresponding to the second aggregation level is determined based on the terminal identifier.

According to a fourth aspect, a candidate control channel resource determining apparatus is provided, including:

a processing unit, configured to determine control information; and a transceiver unit, configured to: determine a control channel resource element occupied by each candidate control channel in a target set, and send the control information on a control channel resource element occupied by at least one candidate control channel in the target set, where the target set is a candidate control channel set that is of a first aggregation level and that is determined from a first quantity of candidate control channel sets corresponding to the first aggregation level based on a terminal identifier of a terminal, the first quantity of candidate control channel sets corresponding to the first aggregation level include control channel resource elements included in a candidate control channel set corresponding to a second aggregation level, the first aggregation level is less than the second aggregation level, and the aggregation level is a quantity of control channel resource elements included in a candidate control channel.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the processing unit is specifically configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

According to a fifth aspect, a candidate control channel resource determining apparatus is provided, including:

a processor, configured to determine a first aggregation level and a second aggregation level, where the aggregation level is a quantity of control channel resource elements included in a candidate control channel, the first aggregation level is less than the second aggregation level, and control channel resource elements included in a candidate control channel set corresponding to the second aggregation level form a first quantity of candidate control channel sets corresponding to the first aggregation level, where the processor is configured to: determine one of the first quantity of candidate control channel sets corresponding to the first aggregation level as a target set based on a terminal identifier of the terminal, and determine a control channel resource element occupied by each candidate control channel in the target set; and a transceiver, configured to detect a candidate control channel in the target set for a received signal.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the processor is specifically configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

Optionally, the processor is specifically configured to:

determine the control channel resource elements included in the candidate control channel set corresponding to the second aggregation level, where a control channel resource element occupied by each candidate control channel in the candidate control channel set corresponding to the second aggregation level is determined based on the terminal identifier.

According to a fourth aspect, a candidate control channel resource determining apparatus is provided, including:

a processor, configured to determine control information; and a transceiver, configured to: determine a control channel resource element occupied by each candidate control channel in a target set, and send the control information on a control channel resource element occupied by at least one candidate control channel in the target set, where the target set is a candidate control channel set that is of a first aggregation level and that is determined from a first quantity of candidate control channel sets corresponding to the first aggregation level based on a terminal identifier of a terminal, the first quantity of candidate control channel sets corresponding to the first aggregation level include control channel resource elements included in a candidate control channel set corresponding to a second aggregation level, the first aggregation level is less than the second aggregation level, and the aggregation level is a quantity of control channel resource elements included in a candidate control channel.

Optionally, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

Optionally, the processor is specifically configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

Optionally, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \rfloor$ is a rounding down operation.

Optionally, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

According to a seventh aspect, a computer readable storage medium is provided. The computer readable storage medium stores an instruction. When running on a computer, the instruction enables the computer to perform the methods according to the foregoing aspects.

According to an eighth aspect, a computer program product that includes an instruction is provided. When running on a computer, the computer program product enables the computer to perform the methods according to the foregoing aspects.

DESCRIPTION OF EMBODIMENTS

Technical solutions in various embodiments may be applied to various communications systems, for example, a new radio (New Radio, NR) system, a wireless fidelity (Wi-Fi) system, a worldwide interoperability for microwave access (Worldwide Interoperability for Microwave Access, WiMAX) system, a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, a long term evolution advanced (Long Term Evolution Advanced, LTE-A) system, a universal mobile telecommunications system (Universal Mobile Telecommunications System, UMTS), a 3rd generation partnership project (3rd Generation Partnership Project, 3GPP)-related cellular system, and a 5th generation (5th Generation, 5G) mobile telecommunications system.

In the following, some terms in this application are explained and described, so as to help a person skilled in the art have a better understanding.

(1) A terminal, also referred to as user equipment (User Equipment, UE), is a device providing voice and/or data connectivity for a user, for example, a handheld device or an in-vehicle device that has a wireless connection function. For example, common terminals include a mobile phone, a tablet computer, a notebook computer, a palmtop computer, a mobile Internet device (mobile internet device, MID), and a wearable device such as a smartwatch, a smart band, or a pedometer.

(2) A network device may be a gNB (gNode B), a common base station (such as a Node B or an eNB), a new radio controller (New Radio controller, NR controller), a centralized network element (Centralized Unit), a new radio base station, a remote radio module, a micro base station, a relay (relay), a distributed network element (Distributed Unit), a transmission reception point (Transmission Reception Point, TRP), a transmission point (Transmission Point, TP), or any other wireless access devices. However, the embodiments of this application are not limited thereto.

Figure 1:
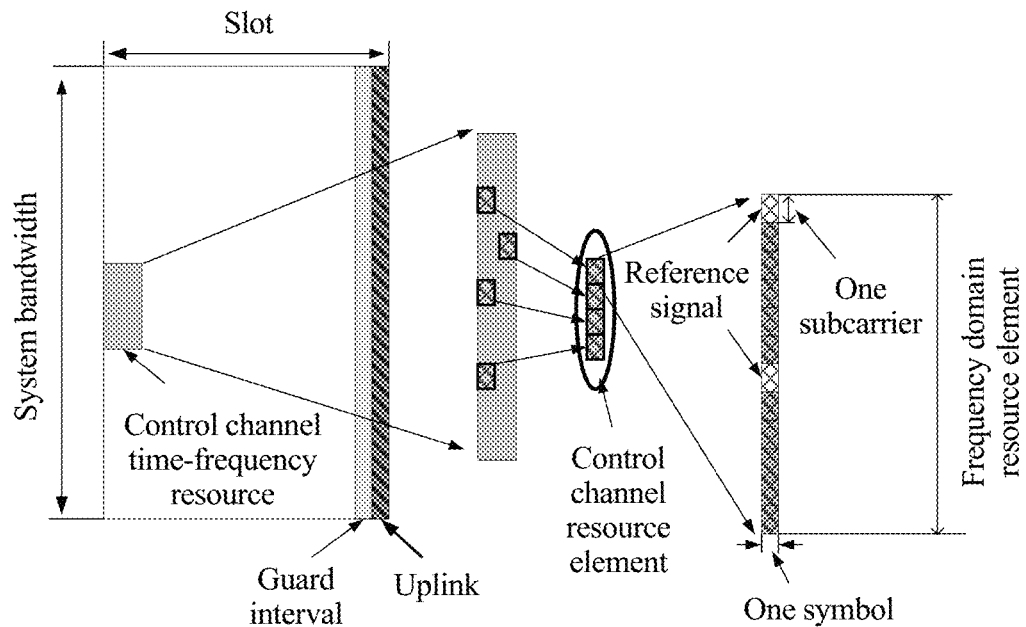
FIG. 1 is a schematic structural diagram of a control channel time-frequency resource in the prior art.
Figure 2:
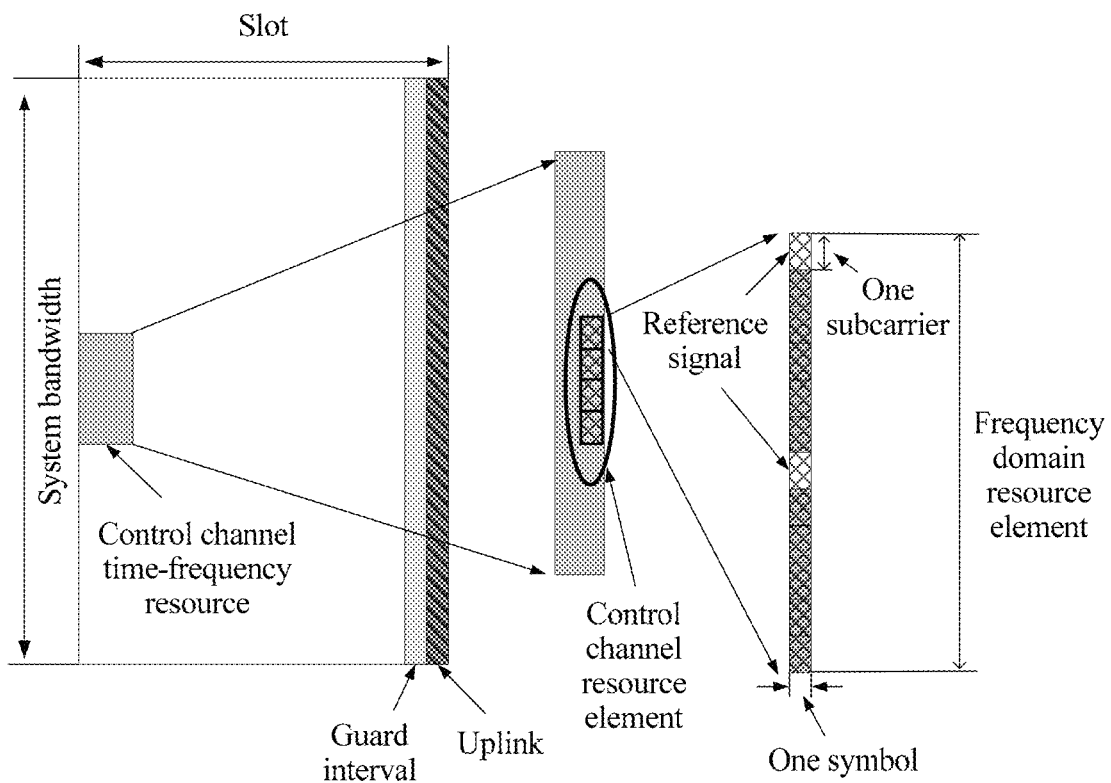
FIG. 2 is a schematic structural diagram of a control channel time-frequency resource in the prior art.

(3) A control channel resource element is a time-frequency resource that includes at least one candidate control channel and that occupies a minimum quantity of resources in frequency domain and a minimum quantity of resources in time domain. The quantity of resources in time domain is a quantity of consecutive symbols in time domain. The quantity of resources in frequency domain is a quantity of consecutive subcarriers in frequency domain. The control channel resource element is also referred to as a control channel element (Control Channel Element, CCE), or is referred to as an enhanced control channel element (Enhanced Control Channel Element, eCCE), or is referred to as a new radio control channel element (New Radio Control Channel Element, NR-CCE) in 5G Frequency domain resource elements included in each control channel resource element in frequency domain may be consecutively mapped or may be discretely mapped in frequency domain, and a mapping manner of the frequency domain resource elements in time domain is not limited. For example, FIG. 1 shows composition of a control channel time-frequency resource and a control channel resource element. Frequency domain resource elements forming the control channel resource element are discretely mapped in frequency domain. In FIG. 2, frequency domain resource elements forming a control channel resource element are consecutively mapped in frequency domain. In addition, as shown in FIG. 1 and FIG. 2, the control channel resource element includes a reference signal used for channel estimation and demodulation and decoding. Reference signals in different control channel resource elements may be different. For example, when a transmit end sends the reference signals in the control channel resource elements, different scrambling code sequences, orthogonal code sequences, precoding sequences, or the like are used.

(4) A frequency domain resource element is a resource element occupying a plurality of consecutive subcarriers in frequency domain, and is not defined in time domain, for example, a resource element occupying 12 consecutive subcarriers in frequency domain. One control channel resource element includes one or more frequency domain resource elements in frequency domain. For details, refer to FIG. 1 or FIG. 2.

(5) An aggregation level (Aggregation Level, AL) refers to a quantity of control channel resource elements included in a candidate control channel.

(6) "A plurality of" refers to two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although the terms "first", "second", "third", and the like may be used in the embodiments of this application to describe various messages, requests, and terminals, these messages, requests, and terminals are not limited to these terms. These terms are merely used to distinguish between the messages, requests, and terminals.

Figure 3:
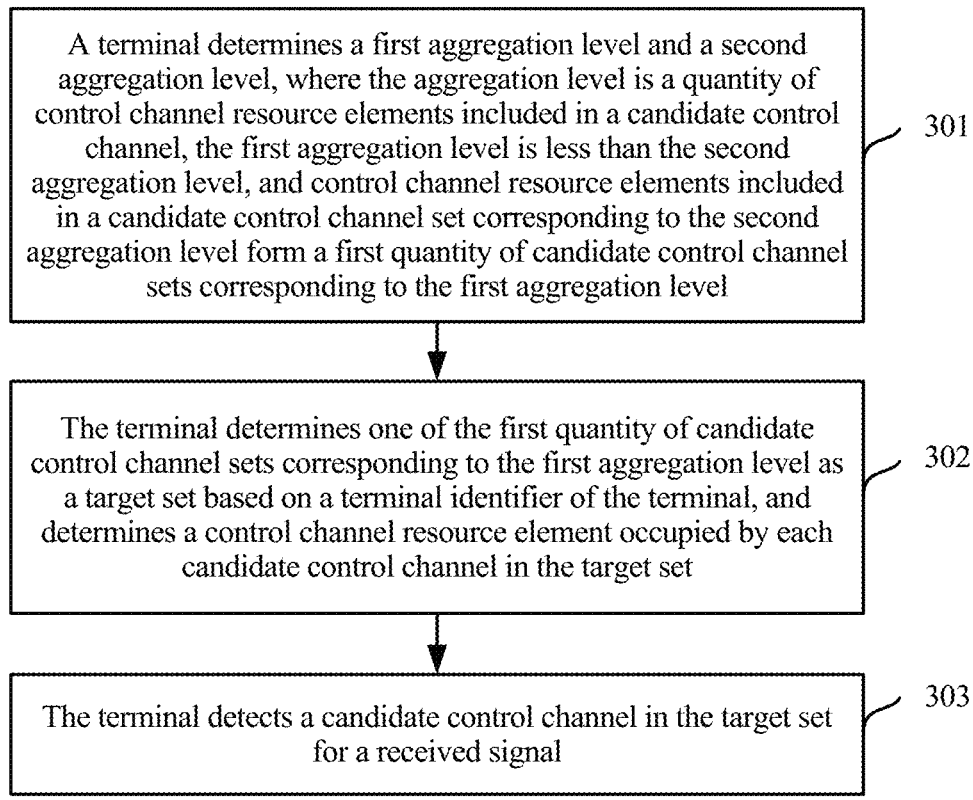
FIG. 3 is a schematic flowchart of a candidate control channel resource determining method according to an embodiment of this application.

Based on the foregoing description, FIG. 3 is a schematic flowchart of a candidate control channel resource determining method according to an embodiment of this application.

Referring to FIG. 3, the method includes the following steps:

Step 301: A terminal determines a first aggregation level and a second aggregation level, where the aggregation level is a quantity of control channel resource elements included in a candidate control channel, the first aggregation level is less than the second aggregation level, and control channel resource elements included in a candidate control channel set corresponding to the second aggregation level form a first quantity of candidate control channel sets corresponding to the first aggregation level.

Step 302: The terminal determines one of the first quantity of candidate control channel sets corresponding to the first aggregation level as a target set based on a terminal identifier of the terminal, and determines a control channel resource element occupied by each candidate control channel in the target set.

Step 303: The terminal detects a candidate control channel in the target set for a received signal.

In step 301, the terminal may first determine a quantity of control channel resource elements included in a control channel time-frequency resource. The quantity may be denoted as $Q_{NR-CCE}$, and the control channel resource elements are successively numbered as 0, 1, 2, . . . , and $Q_{NR-CCE}-1$.

The terminal may detect a candidate control channel set on the control channel time-frequency resource. The candidate control channel set includes a plurality of candidate control channels, and the candidate control channels carry identifier information of the terminal and control information of the terminal. The terminal detects the candidate control channel set, and demodulates and decodes information carried on the candidate control channels, to obtain the control information sent to the terminal.

Figure 4:
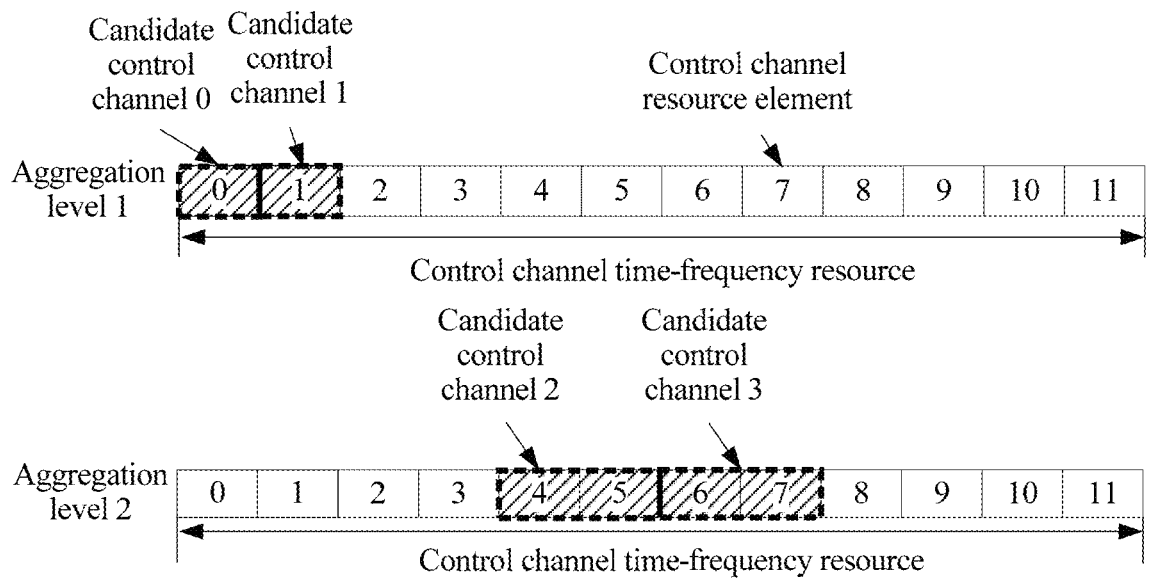
FIG. 4 is a schematic structural diagram of a control channel time-frequency resource according to an embodiment of this application.

One control channel time-frequency resource includes at least one aggregation level, and the aggregation level is a quantity of control channel resource elements included in a candidate control channel. When there are a plurality of aggregation levels, for example, the aggregation levels are {1, 2, 4, and 8}, each aggregation level corresponds to a candidate control channel set, which may also be referred to as search space. If an aggregation level is 1, a candidate control channel included in a candidate control channel set corresponding to the aggregation level 1 includes only one control channel resource element. Start numbers of control channel resource elements in candidate control channel sets corresponding to different aggregation levels may be different. For example, as shown in FIG. 4, the control channel time-frequency resource includes 12 control channel resource elements, that is, $Q_{NR-CCE}=12$. A start number of control channel resource elements in a candidate control channel set corresponding to the aggregation level 1 for a specified terminal may be a control channel resource element 0, and the candidate control channel set corresponding to the aggregation level 1 includes two candidate control channels. In addition, a start number of control channel resource elements in a candidate control channel set corresponding to an aggregation level 2 for the terminal may be a control channel resource element 4, and the candidate control channel set corresponding to the aggregation level 2 includes two candidate control channels. The start number of the control channel resource elements may be a random number related to the terminal identifier.

It should be noted that, in this embodiment, detection may be defined as decoding the control information carried on the candidate control channels, and receiving indication information in the control information based on a format of the control information and a bit sequence that is obtained after the decoding.

The terminal may determine a plurality of aggregation levels. For one aggregation level, a plurality of candidate control channels are included, and form a candidate control channel set corresponding to the aggregation level. All candidate control channels in a candidate control channel set corresponding to each aggregation level include a same quantity of control channel resource elements. For example, if an aggregation level is 1, and a candidate control channel set corresponding to the aggregation level 1 includes six candidate control channels, all of the six candidate control channels include same control channel resource elements, and a quantity of control channel resource elements included in each candidate control channel is 1. If an aggregation level is 4, and a candidate control channel set corresponding to the aggregation level 4 includes three candidate control channels, all of the three candidate control channels include same control channel resource elements, and a quantity of control channel resource elements included in each candidate control channel is 4.

With reference to the foregoing description, the terminal may determine the first aggregation level and the second aggregation level. It should be noted that, when the terminal determines the first aggregation level and the second aggregation level, the terminal may further determine another aggregation level. For ease of description, only the first aggregation level and the second aggregation level are used as an example for description herein. For another case, refer to description in this embodiment of this application. Details are not described herein again.

Figure 5:
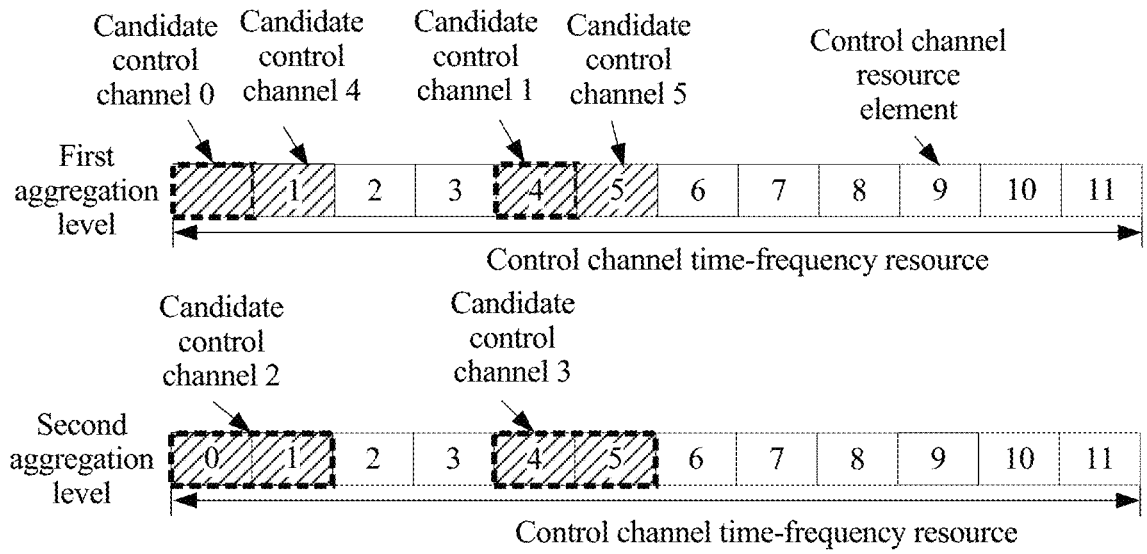
FIG. 5 is a schematic diagram showing that a candidate control channel occupies a control channel resource element according to an embodiment of this application.

It should be noted that, in this embodiment, the control channel resource elements included in the candidate control channel set corresponding to the second aggregation level form the first quantity of candidate control channel sets corresponding to the first aggregation level. To be specific, a set of control channel resource elements occupied by a candidate control channel corresponding to the first aggregation level is a subset of a resource element set corresponding to the second aggregation level. For example, FIG. 5 is a schematic diagram showing that a candidate control channel occupies a control channel resource element according to an embodiment of this application. In FIG. 5, the first aggregation level is 1, and the second aggregation level is 2. The control channel time-frequency resource includes 12 control channel resource elements, which are successively numbered as 0 to 11. In FIG. 5, the control channel resource elements included in the candidate control channel set corresponding to the second aggregation level form candidate control channel sets corresponding to two first aggregation levels, which are respectively a first aggregation level A and a first aggregation level B. The candidate control channel set corresponding to the second aggregation level includes a candidate control channel 2 and a candidate control channel 3, a candidate control channel set corresponding to the first aggregation level A includes a candidate control channel 0 and a candidate control channel 1, and a candidate control channel set corresponding to the first aggregation level B includes a candidate control channel 4 and a candidate control channel 5. The candidate control channel 0 and the candidate control channel 1 respectively occupy a control channel resource element 0 and a control channel resource element 4. The candidate control channel 4 and the candidate control channel 5 respectively occupy a control channel resource element 1 and a control channel resource element 5. The candidate control channel 2 and the candidate control channel 3 respectively occupy control channel resource elements {0 and 1} and control channel resource elements {4 and 5}.

In some embodiments, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

For example, if $B_2$ is 2, $L_2$ is 2, $B_1$ is 2, and $L_1$ is 1, D is equal to 2. In other words, the control channel resource elements included in the candidate control channel set corresponding to the second aggregation level form two candidate control channel sets corresponding to the first aggregation level.

It should be noted that, in this embodiment, if there is no special description, all of the candidate control channel sets corresponding to the first aggregation level that include the control channel resource elements included in the candidate control channel set corresponding to the second aggregation level have a same quantity of candidate control channels. With reference to the foregoing example, when $B_2$ is 2, $L_2$ is 2, $B_1$ is 2, and $L_1$ is 1, each of the two candidate control channel sets corresponding to the first aggregation level includes two candidate control channels.

The terminal may also determine, based on higher layer signaling sent by a network device, a quantity of candidate control channels included in each of the first quantity of candidate control channel sets corresponding to the first aggregation level. Alternatively, the terminal and the network device may agree in advance on a quantity of candidate control channels included in each candidate control channel set corresponding to the first aggregation level.

In some embodiments, there is at least one group of aggregation levels, and each group includes at least two aggregation levels. For example, the aggregation levels include {1, 2, 4, and 8}, the aggregation levels {1 and 2} are a first group, and the aggregation levels {4 and 8} are a second group. A time-frequency resource occupied by the first group of aggregation levels partially overlaps a time-frequency resource occupied by the second group of aggregation levels.

In step 302, the terminal may determine the quantity of candidate control channels corresponding to the second aggregation level that are included in the second aggregation level, and a control channel resource element occupied by each candidate control channel in the candidate control channel set corresponding to the second aggregation level.

The quantity of candidate control channels corresponding to the second aggregation level that are included in the second aggregation level may be agreed on in advance, or may be notified by the network device to the terminal by using higher layer signaling.

The following describes how to determine the control channel resource element occupied by each candidate control channel in the candidate control channel set corresponding to the second aggregation level.

Figure 6:
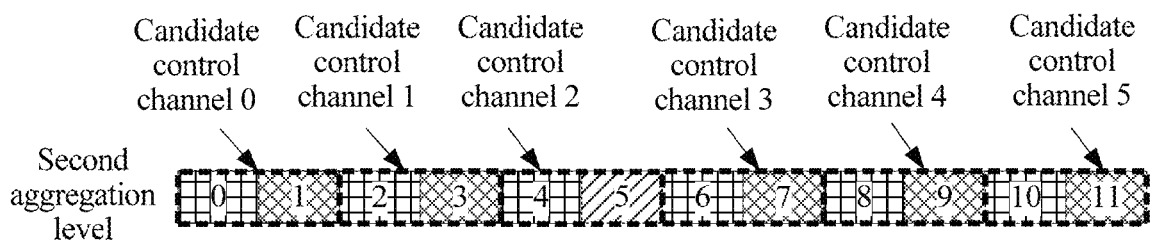
FIG. 6 is a schematic diagram showing that a candidate control channel occupies a control channel resource element according to an embodiment of this application.

In a first possible implementation, the control channel resource elements included in the candidate control channel set corresponding to the second aggregation level are all control channel resource elements in the control channel time-frequency resource. In this case, the control channel resource element occupied by each candidate control channel in the candidate control channel set corresponding to the second aggregation level may be indirectly determined based on a size of the control channel time-frequency resource. For example, as shown in FIG. 6, the second aggregation level is 2, the candidate control channel set corresponding to the second aggregation level includes six candidate control channels, and the control channel time-frequency resource includes 12 control channel resource elements whose numbers are successively 0 to 11. In this case, each candidate control channel includes 12/6=2 control channel resource elements. For any candidate control channel K, if a number of a first control channel resource element in the candidate control channel K is U, a number of a first control channel resource element in an adjacent candidate control channel K+1 is $U+L_2$. Herein, $L_2$ represents the second aggregation level. Similarly, if the number of the first control channel resource element in the candidate control channel K is U, a number of a first control channel resource element in an adjacent candidate control channel K−1 is $U-L_2$. With reference to FIG. 6, numbers of first control channel resource elements in all candidate control channels corresponding to the second aggregation level are respectively {0, 2, 4, 6, 8, and 10}. Correspondingly, numbers of second control channel resource elements in all the candidate control channels corresponding to the second aggregation level are respectively {1, 3, 5, 7, 9, and 11}.

Figure 7:
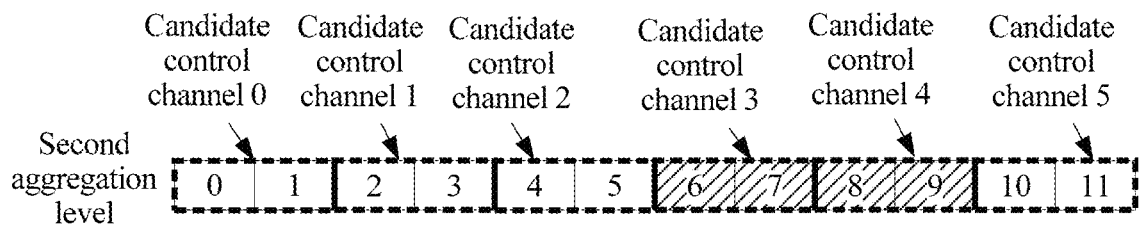
FIG. 7 is a schematic diagram showing that a candidate control channel occupies a control channel resource element according to an embodiment of this application.

In another implementation, the candidate control channels in the candidate control channel set corresponding to the second aggregation level are consecutive in time domain. The control channel resource element occupied by each candidate control channel in the candidate control channel set corresponding to the second aggregation level may be determined based on the terminal identifier of the terminal. For example, as shown in FIG. 7, the second aggregation level is 2, and the control channel time-frequency resource includes 12 control channel resource elements whose numbers are successively 0 to 11. The control channel time-frequency resource includes $\lfloor Q_{NR-CCE}/L_2 \rfloor$ candidate control channels. Herein, $L_2$ is the second aggregation level. A plurality of candidate control channels corresponding to the second aggregation level are consecutive on a resource. In some embodiments, adjacent candidate control channels include control channel resource elements without an interval therebetween on the control channel resource. If a value of the terminal identifier is P, a start control channel time-frequency resource element in the candidate control channel set corresponding to the second aggregation level is an $M^{th}$ control channel time-frequency resource element in all the candidate control channels included in the control channel time-frequency resource. Herein, $M=L_2 \times (P \bmod \lfloor Q_{NR-CCE}/L_2 \rfloor)-1$. If $Q_{NR-CCE}=12$, $L_2=2$, and P=9, M=6. With reference to FIG. 7, a number of a first control channel resource element occupied by a start candidate control channel in the candidate control channel set corresponding to the second aggregation level is 6. Subsequently, the terminal may determine a number of a control channel resource element occupied by another candidate control channel in the candidate control channel set corresponding to the second aggregation level. Herein, P meets the following formula:

$P=(A \times n) \bmod C$, where

A and C are preset constants, for example, A=39827 and C=65537, and n is the terminal identifier.

In some embodiments, P may alternatively meet the following formula:

$P=Q_v$, and $Q_v=(A \times Q_{v-1}) \bmod C$, where $Q_{n-1}=n$, n is the terminal identifier, v is a natural number greater than or equal to 0, and A and C are preset constants, for example, A=39827 and C=65537.

Figure 8:
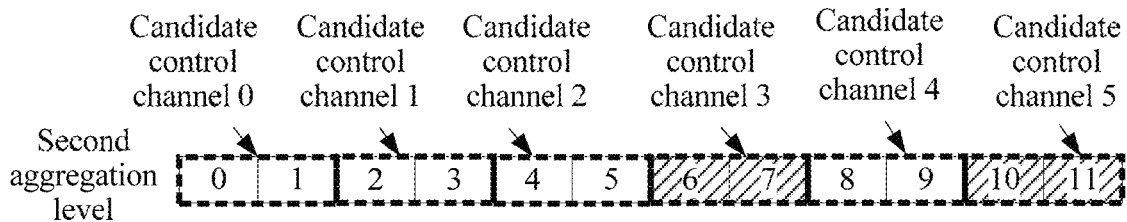
FIG. 8 is a schematic diagram showing that a candidate control channel occupies a control channel resource element according to an embodiment of this application.

With reference to the second implementation, in a third possible implementation, the candidate control channels in the candidate control channel set corresponding to the second aggregation level are discrete in time domain. After determining the start control channel resource element in the candidate control channel set corresponding to the second aggregation level, the terminal may determine, with reference to a quantity R of candidate control channels serving as an interval between two adjacent candidate channels, the control channel resource element occupied by each candidate control channel. If there are two candidate control channels corresponding to the second aggregation level, and the start control channel resource element is a control channel resource element J, numbers of start control channel resource elements of all the candidate control channels are {J and J+(R+1)×$L_2$}, where R≥1. For example, if R=1 and J=6, the start control channel resource elements of all the candidate control channels included in the candidate control channel set corresponding to the second aggregation level are a control channel resource element 6 and a control channel resource element 10. Details are shown in FIG. 8.

In this embodiment, the terminal may determine, in the following manner, the control channel resource element occupied by the target set.

In a first step, the terminal may first determine the quantity of candidate control channels included in the target set.

With reference to the foregoing description, the terminal may determine, by using higher layer signaling, the quantity of candidate control channels included in the target set. Alternatively, the terminal and the network device may agree in advance on the quantity of candidate control channels included in the target set.

In a second step, the terminal determines a first number, where the first number is a number of a first control channel resource element that is of a first candidate control channel in the target set and that is in the first quantity of candidate control channel sets corresponding to the first aggregation level.

Figure 9:
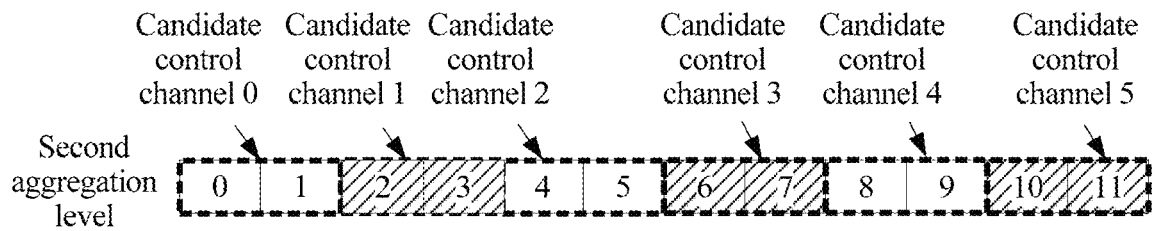
FIG. 9 is a schematic diagram showing that a candidate control channel occupies a control channel resource element according to an embodiment of this application.

It should be noted that, the first number is the number of the first control channel resource element that is of the first candidate control channel in the target set and that is in the first quantity of candidate control channel sets corresponding to the first aggregation level. For example, the candidate control channel set corresponding to the second aggregation level includes $B_2$ candidate control channels, the second aggregation level is $L_2$, and the candidate control channel set corresponding to the second aggregation level includes $B_2 \times L_2$ control channel resource elements. The $B_2 \times L_2$ control channel resource elements are successively numbered, and numbers are respectively 0 to $B_2 \times L_2-1$. The first number may be any one of 0 to $B_2 \times L_2-1$. With reference to the foregoing description, as shown in FIG. 9, in FIG. 9, the control channel time-frequency resource includes 12 control channel resource elements whose numbers are successively 0 to 11. The first aggregation level is 1, the second aggregation level is 2, the candidate control channel set corresponding to the second aggregation level includes three candidate control channels, and occupied control channel resource elements are control channel resource elements 2, 3, 6, 7, 10, and 11. The first quantity of candidate control channel sets corresponding to the first aggregation level include 3×2=6 control channel resource elements, which may be respectively numbered as 0 to 5, and respectively occupied control channel resource elements are successively the control channel resource elements 2, 3, 6, 7, 10, and 11. If the first number is 3, it indicates that the first control channel resource element of the candidate control channel corresponding to the first number is a fourth control channel resource element in the first quantity of candidate control channel sets corresponding to the first aggregation level, and the occupied control channel resource element is a control channel resource element 7.

In some embodiments, the first number may meet the following formula:

$$N_1=L_1\times(P \bmod \lfloor B_2/L_1 \rfloor),$$

where $N_1$ is the first number, $B_2$ is the quantity of candidate control channels corresponding to the second aggregation level that are included in the second aggregation level, $L_1$ is the first aggregation level, and mod is a modulo operation. Herein, P meets the following formula:

$$P=(A\times n) \bmod C,$$

where

A and C are preset constants, for example, A=39827 and C=65537, and n is the terminal identifier.

In some embodiments, P may alternatively meet the following formula:

$$P=Q_v,$$

and $$Q_v=(A\times Q_{v-1}) \bmod C,$$

where $Q_{v-1}$=n, n is terminal identifier information and is a natural number that is not equal to 0, v is a natural number greater than or equal to 0, and A and C are preset constants, for example, A=39827 and C=65537.

In a third step, the terminal determines a second quantity, where the second quantity is a quantity of candidate control channels serving as an interval between two adjacent candidate control channels corresponding to the first aggregation level, and the second quantity is greater than or equal to a difference between the second aggregation level and the first aggregation level.

The quantity of candidate control channels serving as the interval is a quantity of candidate channels included between the two candidate control channels. For example, as shown in FIG. 9, in FIG. 9, the second aggregation level is 2, the candidate control channel set corresponding to the second aggregation level includes three candidate control channels, which are respectively a candidate control channel 1, a candidate control channel 3, and a candidate control channel 5, and the quantity of candidate control channels serving as the interval between the two candidate control channels is 1.

In some embodiments, the second quantity may meet the following formula:

$$I_1=\lfloor (B_2\times L_2)/(L_1\times B_1) \rfloor$$

or $$I_1=k\times \lfloor (B_2\times L_2)/(k\times L_1\times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

In a fourth step, the terminal may determine, based on the first number and the second quantity, the control channel resource element occupied by each candidate control channel in the target set.

It should be noted that an execution sequence of the first step to the fourth step is not limited, and the first step to the fourth step may be performed at the same time or in another sequence. This is not limited in this embodiment of this application.

Figure 10:
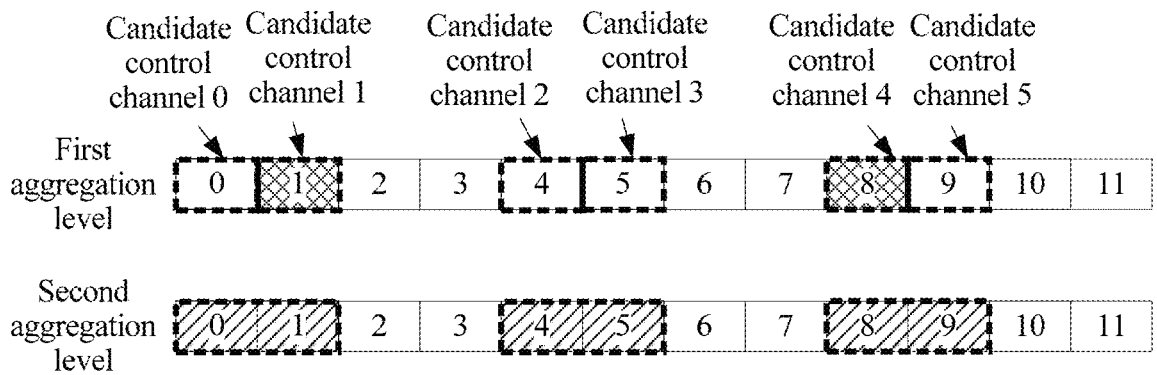
FIG. 10 is a schematic diagram showing that a candidate control channel occupies a control channel resource element according to an embodiment of this application.

With reference to the foregoing first to fourth steps, as shown in FIG. 10, the first aggregation level is 1, and the second aggregation level is 2. The control channel time-frequency resource includes 12 control channel resource elements, which are successively numbered as 0 to 11.

Figure 11:
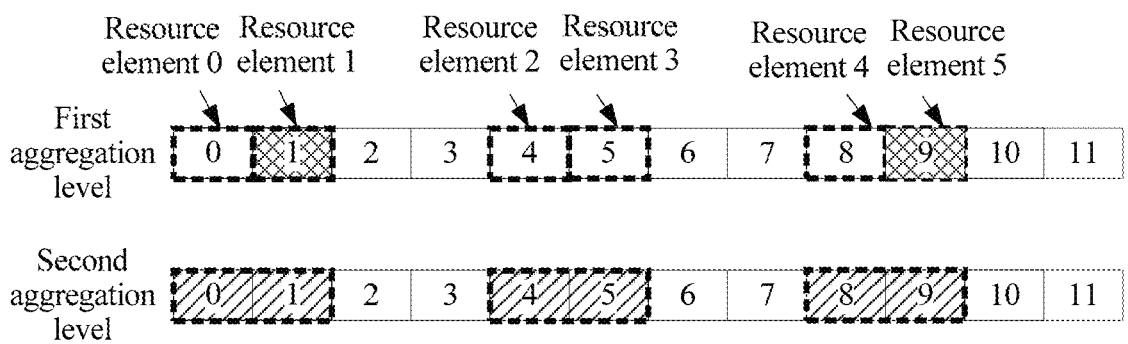
FIG. 11 is a schematic diagram showing that a candidate control channel occupies a control channel resource element according to an embodiment of this application.

With reference to the foregoing first to fourth steps, as shown in FIG. 11, the first aggregation level is 1, and the second aggregation level is 2. The control channel time-frequency resource includes 12 control channel resource elements, which are successively numbered as 0 to 11. The target set includes two candidate control channels. The candidate control channel set corresponding to the second aggregation level includes three candidate control channels, and occupied control channel resource elements are control channel resource elements 0, 1, 4, 5, 8, and 9. The first quantity of candidate control channel sets corresponding to the first aggregation level include 3×2/1=6 candidate control channels, which may be respectively numbered as a candidate control channel 0 to a candidate control channel 5, and respectively occupied control channel resource elements are successively control channel resource elements 0, 1, 4, 5, 8, and 9. With reference to formula (6), the second quantity can be determined as $\lfloor (3\times 2)/(1\times 2) \rfloor$=3. If P is 10, with reference to formula (2), the first number can be determined as 1=1×(10 mod $\lfloor 3/1 \rfloor$). In this case, a control channel resource element occupied by a first control channel resource element of a first candidate control channel in the target set and a control channel resource element occupied by a first control channel resource element of a second candidate control channel in the target set are successively a control channel resource element 1 and a control channel resource element 5, and numbers of corresponding control channel resource elements are respectively 1 and 9.

Finally, in step 303, the terminal may first receive a signal, buffer the signal, then determine a control channel resource element occupied by each candidate control channel, and detect the candidate control channel corresponding to the signal in the target set. Alternatively, the terminal may first determine a control channel resource element occupied by each candidate control channel, then receive a signal, and detect the candidate control channel corresponding to the signal in the target set. This is not limited in this embodiment of this application. In some embodiments, the signal is a radio signal that is carried on a control channel time-frequency resource area and that is sent by the network device to the terminal.

Figure 12:
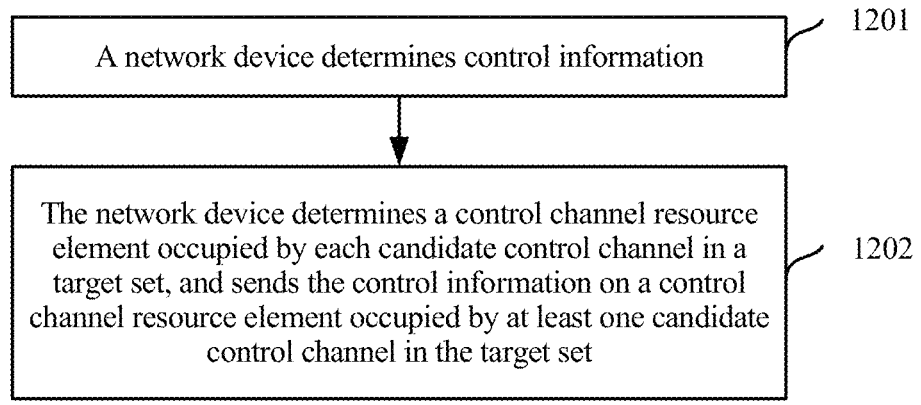
FIG. 12 is a schematic flowchart of a candidate control channel resource determining method according to an embodiment of this application.

Based on the foregoing description, FIG. 12 is a schematic flowchart of a candidate control channel resource determining method according to an embodiment of this application.

Referring to FIG. 12, the method includes the following steps:

Step 1201: A network device determines control information.

Step 1202: The network device determines a control channel resource element occupied by each candidate control channel in a target set, and sends the control information on a control channel resource element occupied by at least one candidate control channel in the target set.

The target set is a candidate control channel set that is of a first aggregation level and that is determined from a first quantity of candidate control channel sets corresponding to the first aggregation level based on a terminal identifier of a terminal, the first quantity of candidate control channel sets corresponding to the first aggregation level include control channel resource elements included in a candidate control channel set corresponding to a second aggregation level, the first aggregation level is less than the second aggregation level, and the aggregation level is a quantity of control channel resource elements included in a candidate control channel.

In step 1201, the control information may be information such as DCI.

In step 1202, the first quantity may meet the following formula:

$$D=\lfloor (B_2 \times L_2)/(L_1 \times B_1) \rfloor \quad (8)$$

Herein, D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

The network device may determine, in the following manner, the control channel resource element occupied by each candidate control channel in the target set.

The network device determines, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

For example content of the foregoing process, refer to description in step 302. Details are not described herein again.

In some embodiments, the second quantity meets the following formula:

$$I_1=\lfloor (B_2 \times L_2)/(L_1 \times B_1) \rfloor$$

or $$I_1=k \times \lfloor (B_2 \times L_2)/(k \times L_1 \times B_1) \rfloor \quad (9)$$

Herein, $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

Optionally, the first number meets the following formula:

$$N_1=L_1 \times (P \bmod \lfloor B_2/L_1 \rfloor) \quad (10)$$

Herein, $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

Based on a same technical concept, an embodiment of this application further provides a candidate control channel resource determining apparatus. The apparatus may perform the foregoing method embodiment.

Figure 13:
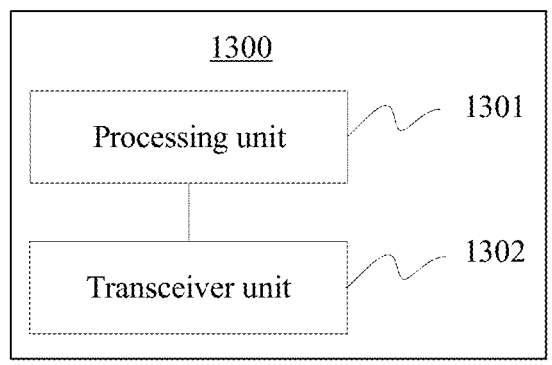
FIG. 13 is a schematic structural diagram of a candidate control channel resource determining apparatus according to an embodiment of this application.

FIG. 13 is a schematic structural diagram of a candidate control channel resource determining apparatus 1300 according to an embodiment of this application. The apparatus 1300 may be a device such as a terminal.

Referring to FIG. 13, the apparatus 1300 includes:

a processing unit 1301, configured to determine a first aggregation level and a second aggregation level, where the aggregation level is a quantity of control channel resource elements included in a candidate control channel, the first aggregation level is less than the second aggregation level, and control channel resource elements included in a candidate control channel set corresponding to the second aggregation level form a first quantity of candidate control channel sets corresponding to the first aggregation level, where the processing unit 1301 is configured to: determine one of the first quantity of candidate control channel sets corresponding to the first aggregation level as a target set based on a terminal identifier of the terminal, and determine a control channel resource element occupied by each candidate control channel in the target set; and a transceiver unit 1302, configured to detect a candidate control channel in the target set for a received signal.

In some embodiments, the first quantity meets the following formula:

$$D=\lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor \ \rfloor$ is a rounding down operation.

In some embodiments, the processing unit is configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

In some embodiments, the second quantity meets the following formula:

$$I_1=\lfloor (B_2 \times L_2)/(L_1 \times B_1) \rfloor$$

or $$I_1=k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor \ \rfloor$ is a rounding down operation.

In some embodiments, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

In some embodiments, the processing unit is specifically configured to:

determine the control channel resource elements included in the candidate control channel set corresponding to the second aggregation level, where a control channel resource element occupied by each candidate control channel in the candidate control channel set corresponding to the second aggregation level is determined based on the terminal identifier.

Figure 14:
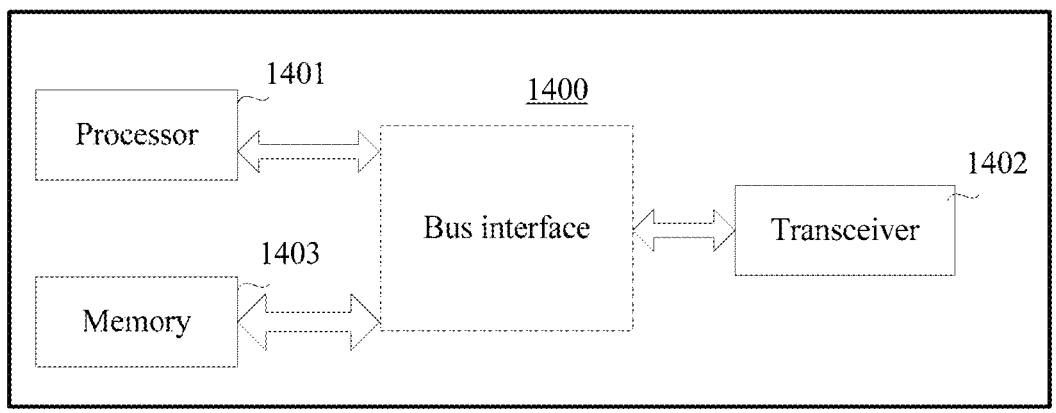
FIG. 14 is a schematic structural diagram of a terminal according to an embodiment of this application.

It should be understood that division of the foregoing units is merely logical function division. In actual implementation, all or some of the units may be integrated into one physical entity, or the units may be physically separated. In this embodiment of this application, the transceiver unit 1302 may be implemented by a transceiver, and the processing unit 1301 may be implemented by a processor. As shown in FIG. 14, a terminal 1400 may include a processor 1401, a transceiver 1402, and a memory 1403. The memory 1403 may be configured to store a program/code that is pre-installed when the terminal 1400 is delivered from a factory, or may store code or the like executed by the processor 1401.

Based on a same technical concept, an embodiment of this application further provides a candidate control channel resource determining apparatus. The apparatus may perform the foregoing method embodiment.

Figure 15:
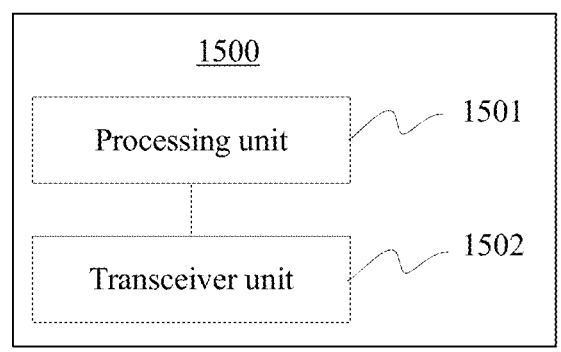
FIG. 15 is a schematic structural diagram of a candidate control channel resource determining apparatus according to an embodiment of this application.

FIG. 15 is a schematic structural diagram of a candidate control channel resource determining apparatus 1500 according to an embodiment of this application. The apparatus 1500 may be a device such as a network device.

Referring to FIG. 15, the apparatus 1500 includes:

a processing unit 1501, configured to determine control information; and a transceiver unit 1502, configured to: determine a control channel resource element occupied by each candidate control channel in a target set, and send the control information on a control channel resource element occupied by at least one candidate control channel in the target set, where the target set is a candidate control channel set that is of a first aggregation level and that is determined from a first quantity of candidate control channel sets corresponding to the first aggregation level based on a terminal identifier of a terminal, the first quantity of candidate control channel sets corresponding to the first aggregation level include control channel resource elements included in a candidate control channel set corresponding to a second aggregation level, the first aggregation level is less than the second aggregation level, and the aggregation level is a quantity of control channel resource elements included in a candidate control channel.

In some embodiments, the first quantity meets the following formula:

$$D = \lfloor (B_2 \times L_2)/(L_1 \times B_1) \rfloor,$$

where

D is the first quantity, $B_2$ is a quantity of candidate control channels corresponding to the second aggregation level that are included in the second aggregation level, $L_2$ is the second aggregation level, $B_1$ is a quantity of candidate control channels included in the target set, $L_1$ is the first aggregation level, and $\lfloor\ \rfloor$ is a rounding down operation.

In some embodiments, the processing unit is specifically configured to:

determine, based on a first number and a second quantity, the control channel resource element occupied by each candidate control channel in the target set, where the first number is a number of a first control channel resource element that is of a first candidate control channel in the target set determined based on the terminal identifier and that is in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

In some embodiments, the second quantity meets the following formula:

$$I_1 = \lfloor (B_2 \times L_2)/(L_1 \times B_1) \rfloor$$

or $$I_1 = k \times \lfloor (B_2 \times L_2)/(k \times L_1 \times B_1) \rfloor,$$

where $I_1$ is the second quantity, $B_1$ is the quantity of candidate control channels included in the target set, $B_2$ is the quantity of candidate control channels corresponding to the second aggregation level that are included in the second aggregation level, k is a preset value, k is a positive integer and is an even number, $L_1$ is the first aggregation level, $L_2$ is the second aggregation level, and $\lfloor\ \rfloor$ is a rounding down operation.

In some embodiments, the first number meets the following formula:

$$N_1 = L_1 \times (P \bmod \lfloor B_2/L_1 \rfloor),$$

where $N_1$ is the first number, P is a parameter related to terminal identifier information, $B_2$ is the quantity of candidate control channels corresponding to the second aggregation level that are included in the second aggregation level, $L_1$ is the first aggregation level, and mod is a modulo operation.

Figure 16:
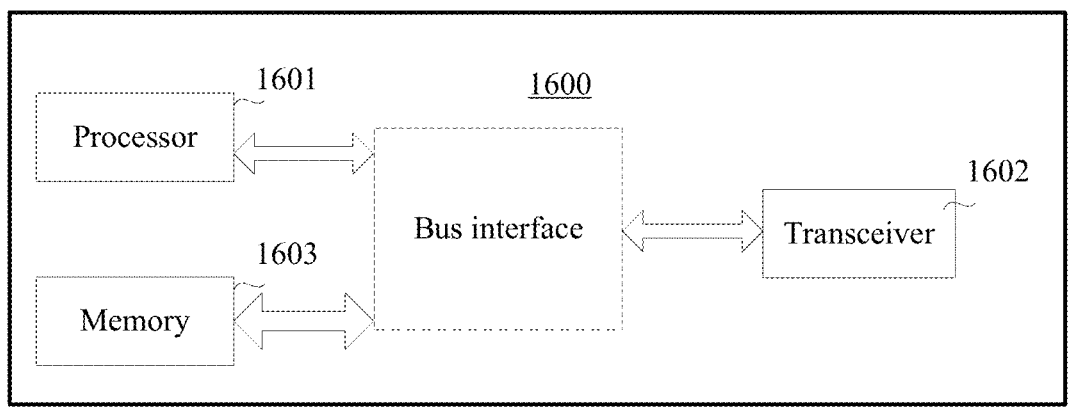
FIG. 16 is a schematic structural diagram of a network device according to an embodiment of this application.

It should be understood that division of the foregoing units is merely logical function division. In actual implementation, all or some of the units may be integrated into one physical entity, or the units may be physically separated. In this embodiment of this application, the transceiver unit 1502 may be implemented by a transceiver, and the processing unit 1501 may be implemented by a processor. As shown in FIG. 16, a network device 1600 may include a processor 1601, a transceiver 1602, and a memory 1603. The memory 1603 may be configured to store a program/code that is pre-installed when the network device 1600 is delivered from a factory, or may store code or the like executed by the processor 1601.

In this embodiment, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (English: central processing unit, CPU for short), a network processor (English: network processor, NP for short), or a combination of a CPU and an NP. The processor may further include a hardware chip. The hardware chip may be an application-specific integrated circuit (English: application-specific integrated circuit, ASIC for short), a programmable logic device (English: programmable logic device, PLD for short), or a combination thereof. The foregoing PLD may be a complex programmable logic device (English: complex programmable logic device, CPLD for short), a field-programmable gate array (English: field-programmable gate array, FPGA for short), generic array logic (English: generic array logic, GAL for short), or any combination thereof. The memory may include a volatile memory (English: volatile memory), for example, a random access memory (English: random access memory, RAM for short). The memory may also include a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory may include a combination of the foregoing types of memories.

A bus interface may be further included in FIG. 14 and FIG. 16. The bus interface may include any quantity of interconnected buses and bridges, which specifically link together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or a microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

A person skilled in the art can make various modifications and variations to this application without departing from the scope of this application. This application is intended to cover these modifications and variations provided that they fall within the scope of protection defined by the following claims of this application.

What is claimed is:

1. A candidate control channel resource determining method for a terminal, comprising:
   determining a first aggregation level, wherein the first aggregation level is less than a second aggregation level, the first aggregation level corresponds to a first candidate control channel set and the second aggregation level corresponds to a second candidate control channel set, wherein control channel resource elements in the second candidate control channel set comprise a first quantity of first candidate control channel sets, and the control channel resource elements occupied by the first quantity of first candidate control channel sets are a subset of the second candidate control channel set;
   determining one of the first quantity of first candidate control channel sets as a target set based on a terminal identifier of the terminal;
   detecting a candidate control channel in the target set; and
   determining the control channel resource elements in the second candidate control channel set, wherein a number of a first control channel resource element occupied by a start candidate control channel in the second candidate control channel set is determined based on the terminal identifier.

2. The method according to claim 1, wherein the first quantity meets the following formula:

$$D = \lfloor (B_2 \times L_2)/(L_1 \times B_1) \rfloor, \text{ wherein}$$

D is the first quantity, $B_2$ is a quantity of candidate control channels corresponding to the second aggregation level that are comprised in the second candidate control channel set, $L_2$ is the second aggregation level, $B_1$ is a quantity of candidate control channels comprised in the target set, $L_1$ is the first aggregation level, and $\lfloor \ \rfloor$ is a rounding down operation.

3. The method according to claim 1, wherein the method further comprises:
   determining, based on a first number and a second quantity, a control channel resource element occupied by each candidate control channel in the target set, wherein
   the first number is a number of a first control channel resource element that is of a first candidate control channel in the target set determined based on the terminal identifier, the number of the first control channel resource element being in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

4. The method according to claim 3, wherein the second quantity meets the following formula:

$$I_1 = \lfloor (B_2 \times L_2)/(L_1 \times B_1) \rfloor \text{ or } I_1 = k \times \lfloor (B_2 \times L_2)/(k \times L_1 \times B_1) \rfloor,$$
wherein $I_1$ is the second quantity, $B_1$ is the quantity of candidate control channels in the target set, $B_2$ is the quantity of candidate control channels corresponding to the second aggregation level that are comprised in the second candidate control channel set, k is a preset value, k is a positive integer and is an even number, $L_1$ is the first aggregation level, $L_2$ is the second aggregation level, and $\lfloor \ \rfloor$ is a rounding down operation.

5. The method according to claim 3, wherein the first number meets the following formula:

$N_1 = L_1 \times (P \bmod \lfloor B_2/L_1 \rfloor)$, wherein $N_1$ is the first number, P is a parameter related to terminal identifier information, $B_2$ is the quantity of candidate control channels corresponding to the second aggregation level that are comprised in the second candidate cont2, and 18 rol channel set, $L_1$ is the first aggregation level, and mod is a modulo operation.

6. A candidate control channel resource determining method for a network device, comprising:
  determining control information; and
  determining a control channel resource element occupied by each candidate control channel in a target set, and
  sending the control information on a control channel resource element occupied by at least one candidate control channel in the target set, wherein
    the target set is a first candidate control channel set determined from a first quantity of first candidate control channel sets based on a terminal identifier of a terminal,
    an aggregation level corresponding to the first quantity of first candidate control channel sets is a first aggregation level, and
    the first aggregation level being less than a second aggregation level corresponding to a second candidate control channel set, wherein
      control channel resource elements in the second candidate control channel set comprise the first quantity of first candidate control channel sets,
      the control channel resource elements occupied by the first quantity of first candidate control channel sets are a subset of the second candidate control channel set, and
      a number of a first control channel resource element occupied by a start candidate control channel in the second candidate control channel set is determined based on the terminal identifier.

7. The method according to claim 6, wherein the first quantity meets the following formula:

$D = \lfloor (B_2 \times L_2)/(L_1 \times B_1) \rfloor$, wherein

D is the first quantity, $B_2$ is a quantity of candidate control channels corresponding to the second aggregation level that are comprised in the second candidate control channel set, $L_2$ is the second aggregation level, $B_1$ is a quantity of candidate control channels comprised in the target set, $L_1$ is the first aggregation level, and $\lfloor \ \rfloor$ is a rounding down operation.

8. The method according to claim 6, wherein determining, by the network device, a control channel resource element occupied by each candidate control channel in a target set comprises:
  determining, by the network device based on a first number and a second quantity, the control channel resource element occupied by each candidate control channel in the target set, wherein
    the first number is a number of a first control channel resource element of a first candidate control channel in the target set determined based on the terminal identifier, the number of the first control channel resource element being in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

9. The method according to claim 8, wherein the second quantity meets the following formula:

$I_1 = \lfloor (B_2 \times L_2)/(L_1 \times B_1) \rfloor$ or $I_1 = k \times \lfloor (B_2 \times L_2)/(k \times L_1 \times B_1) \rfloor$, wherein $I_1$ is the second quantity, $B_1$ is the quantity of candidate control channels comprised in the target set, $B_2$ is the quantity of candidate control channels corresponding to the second aggregation level that are comprised in the second candidate control channel set, k is a preset value, k is a positive integer and is an even number, $L_1$ is the first aggregation level, $L_2$ is the second aggregation level, and $\lfloor \ \rfloor$ is a rounding down operation.

10. The method according to claim 8, wherein the first number meets the following formula:

$N_1 = L_1 \times (P \bmod \lfloor B_2/L_1 \rfloor)$, wherein $N_1$ is the first number, P is a parameter related to terminal identifier information, $B_2$ is the quantity of candidate control channels corresponding to the second aggregation level that are in the second candidate control channel set, $L_1$ is the first aggregation level, and mod is a modulo operation.

11. A candidate control channel resource determining apparatus, comprising:
  a processing unit, configured to determine a first aggregation level, wherein the first aggregation level is less than a second aggregation level, the first aggregation level corresponds to a first candidate control channel set, control channel resource elements in a second candidate control channel set corresponding to the second aggregation level comprise a first quantity of first candidate control channel sets, and the control channel resource elements occupied by the first quantity of first candidate control channel sets are a subset of the second candidate control channel set, wherein
    the processing unit is configured to determine one of the first quantity of candidate control channel sets corresponding to the first aggregation level as a target set based on a terminal identifier of the terminal; and
  a transceiver unit, configured to detect a candidate control channel in the target set; and, wherein the processing unit is further configured to determine the control channel resource elements in the second candidate control channel set, wherein a number of a first control channel resource element occupied by a start candidate control channel in the second candidate control channel set is determined based on the terminal identifier.

12. The apparatus according to claim 11, wherein the first quantity meets the following formula:

$D = \lfloor (B_2 \times L_2)/(L_1 \times B_1) \rfloor$, wherein

D is the first quantity, $B_2$ is a quantity of candidate control channels corresponding to the second aggregation level that are comprised in the second candidate control channel set, $L_2$ is the second aggregation level, $B_1$ is a quantity of candidate control channels comprised in the target set, $L_1$ is the first aggregation level, and $\lfloor \ \rfloor$ is a rounding down operation.

13. The apparatus according to claim 11, wherein the processing unit is further configured to:

determine, based on a first number and a second quantity, a control channel resource element occupied by each candidate control channel in the target set, wherein the first number is a number of a first control channel resource element of a first candidate control channel in the target set determined based on the terminal identifier, the number of the first control channel resource element being in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

14. The apparatus according to claim 13, wherein the second quantity meets the following formula:

$$I_1 = \lfloor (B_2 \times L_2)/(L_1 \times B_1) \rfloor \text{ or } I_1 = k \times \lfloor (B_2 \times L_2)/(k \times L_1 \times B_1) \rfloor,$$
wherein $I_1$ is the second quantity, $B_1$ is the quantity of candidate control channels comprised in the target set, $B_2$ is the quantity of candidate control channels corresponding to the second aggregation level that are comprised in the second candidate control channel set, k is a preset value, k is a positive integer and is an even number, $L_1$ is the first aggregation level, $L_2$ is the second aggregation level, and $\lfloor \ \rfloor$ is a rounding down operation.

15. The apparatus according to claim 13, wherein the first number meets the following formula:

$$N_1 = L_1 \times (P \bmod \lfloor B_2/L_1 \rfloor), \text{ wherein}$$

$N_1$ is the first number, P is a parameter related to terminal identifier information, $B_2$ is the quantity of candidate control channels corresponding to the second aggregation level that are comprised in the second candidate control channel set, $L_1$ is the first aggregation level, and mod is a modulo operation.

16. A candidate control channel resource determining apparatus, comprising:
a processing unit, configured to determine control information; and
a transceiver unit, configured to:
determine a control channel resource element occupied by each candidate control channel in a target set, and
send the control information on a control channel resource element occupied by at least one candidate control channel in the target set, wherein the target set is a first candidate control channel set determined from a first quantity of first candidate control channel sets based on a terminal identifier of a terminal,
an aggregation level corresponding to the first quantity of first candidate control channel sets is a first aggregation level, and
the first aggregation level is less than a second aggregation level corresponding to a second candidate control channel set, wherein
control channel resource elements in the second candidate control channel set comprise the first quantity of first candidate control channel sets,
the control channel resource elements occupied by the first quantity of first candidate control channel sets are a subset of the second candidate control channel set, and
a number of a first control channel resource element occupied by a start candidate control channel in the second candidate control channel set is determined based on the terminal identifier.

17. The apparatus according to claim 16, wherein the first quantity meets the following formula:

$$D = \lfloor (B_2 \times L_2)/(L_1 \times B_1) \rfloor, \text{ wherein}$$

D is the first quantity, $B_2$ is a quantity of candidate control channels corresponding to the second aggregation level that are comprised in the second candidate control channel set, $L_2$ is the second aggregation level, $B_1$ is a quantity of candidate control channels comprised in the target set, $L_1$ is the first aggregation level, and $\lfloor \ \rfloor$ is a rounding down operation.

18. The apparatus according to claim 16, wherein the processing unit is specifically configured to:
determine, based on a first number and a second quantity, the control channel resource element occupied by each candidate control channel in the target set, wherein
the first number is a number of a first control channel resource element of a first candidate control channel in the target set determined based on the terminal identifier, the number of the first control channel resource element being in the first quantity of candidate control channel sets corresponding to the first aggregation level, the second quantity is a quantity of candidate control channels serving as an interval between two adjacent candidate control channels corresponding to the first aggregation level, and the second quantity is greater than or equal to a difference between the second aggregation level and the first aggregation level.

* * * * *